US011884580B2

(12) United States Patent
Monmeyran et al.

(10) Patent No.: US 11,884,580 B2
(45) Date of Patent: Jan. 30, 2024

(54) SOLAR-CONTROL GLAZING UNIT COMPRISING A LAYER OF TITANIUM NITRIDE

(71) Applicant: SAINT-GOBAIN GLASS FRANCE, Courbevoie (FR)

(72) Inventors: Corentin Monmeyran, Paris (FR); Lorenzo Mancini, Orsay (FR); Alexandre Dehaupas, Villemomble (FR); Laura Jane Singh, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/802,020

(22) PCT Filed: Feb. 25, 2021

(86) PCT No.: PCT/FR2021/050326
§ 371 (c)(1),
(2) Date: Aug. 24, 2022

(87) PCT Pub. No.: WO2021/170959
PCT Pub. Date: Sep. 2, 2021

(65) Prior Publication Data
US 2023/0144355 A1    May 11, 2023

(30) Foreign Application Priority Data

Feb. 28, 2020   (FR) ........................................ 2002035

(51) Int. Cl.
B32B 15/04        (2006.01)
B32B 17/06        (2006.01)
C03C 17/34        (2006.01)
C03C 17/36        (2006.01)

(52) U.S. Cl.
CPC ...... *C03C 17/3435* (2013.01); *C03C 17/3482* (2013.01); *C03C 17/366* (2013.01); *C03C 2217/281* (2013.01); *C03C 2218/156* (2013.01)

(58) Field of Classification Search
CPC ...................... C03C 17/3435; C03C 2217/281
USPC ......................................................... 428/432
See application file for complete search history.

(56) References Cited

U.S. PATENT DOCUMENTS

| | | | | |
|---|---|---|---|---|
| 5,091,244 A * | 2/1992 | Biornard | ................ | G02B 1/116 359/359 |
| 5,216,542 A * | 6/1993 | Szczyrbowski | ..... | C03C 17/3435 427/166 |
| 5,552,180 A * | 9/1996 | Finley | ................ | C03C 17/3615 427/166 |
| 6,188,512 B1 * | 2/2001 | Woodard | ............... | G02B 5/208 359/359 |
| 6,623,794 B2 * | 9/2003 | Finley | ................ | C03C 17/3605 427/166 |
| 7,037,587 B2 * | 5/2006 | Lin | ....... | C03C 17/225 428/428 |
| 7,166,360 B2 * | 1/2007 | Coustet | ............... | C03C 17/3618 428/428 |
| 8,286,395 B2 * | 10/2012 | Mauvernay | ......... | C03C 17/3652 52/204.5 |
| 9,028,956 B2 * | 5/2015 | Knoll | ................. | C03C 17/3644 428/428 |
| 10,294,147 B2 * | 5/2019 | Lu | ....... | C23C 14/3464 |
| 10,392,300 B2 * | 8/2019 | Boyce | ................. | C23C 14/086 |
| 11,267,754 B2 * | 3/2022 | Singh | ................. | C03C 17/3435 |
| 11,401,205 B2 * | 8/2022 | Reymond | ......... | B32B 17/10091 |
| 2006/0124449 A1 * | 6/2006 | Hartig | ................... | C03C 17/366 204/192.15 |
| 2008/0311389 A1 * | 12/2008 | Roquiny | ............... | C03C 17/366 428/336 |
| 2011/0262726 A1 * | 10/2011 | Knoll | ..................... | C03C 17/36 428/428 |
| 2012/0087005 A1 * | 4/2012 | Reymond | ........... | C03C 17/3626 359/360 |

(Continued)

FOREIGN PATENT DOCUMENTS

| | | |
|---|---|---|
| DE | 10 2013 112990 A1 | 5/2015 |
| DE | 10 2014 114330 A1 | 4/2016 |
| JP | H05-124839 A | 5/1993 |
| WO | WO 01/21540 A1 | 3/2001 |
| WO | WO 02/48065 A1 | 6/2002 |

(Continued)

OTHER PUBLICATIONS

International Search Report as issued in International Patent Application No. PCT/FR2021/050326, dated Apr. 7, 2021.

*Primary Examiner* — Lauren R Colgan

(74) *Attorney, Agent, or Firm* — Pillsbury Winthrop Shaw Pittman LLP

(57) ABSTRACT

A glass article having anti-sun properties includes a glass substrate having a stack of layers, which includes, successively from the surface of the substrate: a first module $M_1$ having a layer based on a dielectric material with a thickness $e_1$ or of a set of layers, a layer $TN_1$ including titanium nitride with a thickness of between 2 nanometers and 80 nanometers, a second module $M_2$ including a layer based on a dielectric material with a thickness $e_2$ or of a set of layers based on dielectric materials with a cumulative thickness $e_2$, an intermediate layer including at least one element selected from silicon, aluminum, titanium or a mixture of at least two of these elements is deposited between the layer $TN_1$ and the first module $M_1$ and/or between the layer $TN_1$ and the second module $M_2$, the intermediate layer having a thickness of between 0.2 nm and 6 nm.

19 Claims, No Drawings

(56) References Cited

U.S. PATENT DOCUMENTS

2014/0319687 A1* 10/2014 Billet .................. H10K 50/805
                                                        438/669
2018/0186691 A1*  7/2018 Lu ...................... C23C 14/0652
2022/0024816 A1*  1/2022 Reymond ......... B32B 17/10036

FOREIGN PATENT DOCUMENTS

WO   WO 2009/112759 A1   9/2009
WO   WO 2012/020189 A1   2/2012

* cited by examiner

SOLAR-CONTROL GLAZING UNIT COMPRISING A LAYER OF TITANIUM NITRIDE

CROSS-REFERENCE TO RELATED APPLICATIONS

This application is the U.S. National Stage of PCT/FR2021/050326, filed Feb. 25, 2021, which in turn claims priority to French patent application number 2002035 filed Feb. 28, 2020. The content of these applications are incorporated herein by reference in their entireties.

The invention relates to so-called solar-control glazing units which are provided with stacks of so-called functional thin layers, i.e. which act on solar and/or thermal radiation substantially by reflection and/or absorption of near (solar) or far (thermal) infrared radiation. The application specifically targeted by the invention is primarily in the construction industry, as a solar-control glazing unit. Without departing from the scope of the invention, the present glazing unit can also be used in vehicle glazing units, such as side windows, car roofs and rear windows.

The term "glazing unit" is understood to mean, in the context of the present invention, any glass product composed of one or more glass substrates, in particular single glazing units, double glazing units, triple glazing units, etc.

A "functional" or "active" layer is understood to mean, in the context of the present application, the layers of the stack which give it the bulk of its thermal insulation properties. Most often, the stacks of thin layers used in the glazing unit give it significantly improved insulation properties, mainly due to the intrinsic properties of said active layers. Said layers act on the flow of thermal infrared radiation passing through said glazing unit, as opposed to the other layers, which are generally made of dielectric material and usually mainly have the function of chemical or mechanical protection of said functional layers. The term "dielectric material" is understood to mean a material whose solid form, which is free of impurities or dopants, has a high resistivity, in particular a resistivity greater than $10^{10}$ ohm·meters ($\Omega$·m) at room temperature (300K).

Such glazing units provided with stacks of thin layers act on the incident IR radiation either substantially by absorption of said radiation by the functional layer(s) or substantially by reflection by these layers.

They are referred to as solar-control glazing units. They are sold and used mainly:
either mainly to provide protection of a dwelling or passenger compartment (vehicle) from solar radiation and prevent excess heating, such glazing units being qualified as anti-sun glazing units in the art;
or mainly to thermally insulate a dwelling and prevent heat loss, these glazing units then being qualified as insulating glazing units.

The expression "anti-sun" is thus understood, in the context of the present invention, to mean the ability of a glazing unit to limit the energy flux and in particular the solar infrared radiation (SIR) passing through it from the exterior to the interior of the dwelling or passenger compartment.

The expression "thermally insulating" is understood to mean a glazing unit equipped with at least one functional layer that decreases energy loss through the unit, said layer having reflective properties that allow it to reflect thermal IR radiation of between 5 and 50 micrometers. The functional layers used in this function have a high IR reflection coefficient and are referred to as low-emissivity (or low-e).

In certain countries, standards require that glazing units both have anti-sun properties and be thermally insulating for glazing units in buildings.

The expression "low-emissivity" is understood to mean a glazing unit provided with at least one functional layer giving it a normal emissivity $\varepsilon_n$ (or total emissivity at normal incidence) of less than 50%, preferably less than 45% or even less than 40%, the emissivity being defined by the equation:

$$\varepsilon_n = 1 - R_n,$$

where $R_n$ is the normal reflection factor (according to Annex A of the international standard ISO 10292 (1994)) of the glazing unit.

The concept of low-emissivity glazing units is described in the reference article from Techniques De l'Ingénieur: "Vitrages à isolation thermique renforcée", C3635 (1999).

Generally, all the energy characteristics presented in the present description are obtained according to the principles and methods described in the international standard ISO 10292 (1994) relating to the determination of the energy insulation characteristics of glazing units used in glass for the construction industry.

These coatings are conventionally deposited by deposition techniques of the CVD type for the simplest cases or more often at present by vacuum sputtering deposition techniques, often referred to as magnetron sputtering in the field, in particular when the coating is made up of a complex stack of successive layers whose thicknesses do not exceed a few nanometers or a few dozen nanometers.

Most often, the stacks of thin layers have solar-control properties mainly due to the intrinsic properties of one or more active layers, which are referred to as functional layers in the present description. An "active" or "functional" layer is thus understood to mean a layer that acts significantly on the flow of solar radiation passing through said glazing unit. Such an active layer, in a known manner, can work either mainly in a mode of reflection of the incident infrared radiation or mainly in a mode of absorption of said infrared radiation.

Most often, these anti-sun layers work partly by reflection and partly by absorption, as already explained above.

In particular, the most efficient stacks currently on the market incorporate at least one metal functional layer made of silver, which functions substantially by reflecting a significant portion of the incident IR (infrared) radiation. The normal emissivity thereof does not exceed a few percent. These stacks are mainly used as low-emissivity (or low-e) glazing units for the thermal insulation of buildings. These layers are however sensitive to moisture and therefore are exclusively used in double glazing units, on face 2 or 3 thereof, in order to be protected from moisture. The stacks according to the invention do not comprise such silver layers, or even gold or platinum layers, or do so only in very negligible quantities, in particular as unavoidable impurities.

Other metal layers having an anti-sun function have also been mentioned in the field, which comprise functional layers of the Nb, Ta or W type or nitrides of these metals, as described for example in WO01/21540. In such layers, the solar radiation is mostly absorbed non-selectively by the functional layer(s), i.e. IR radiation (i.e. with a wavelength between approx. 780 nm and 2500 nm) and visible radiation (with a wavelength between approx. 380 and 780 nm) are absorbed/reflected without distinction. In such glazing units, the values of the normal emissivity $\varepsilon_n$ are generally higher. Lower emissivity values can only be achieved when the functional layer is relatively thick, in particular at least 20 nm for metallic niobium. Due to the non-selective absorption of this layer, the light transmission coefficients of such glazing units are necessarily very low, generally below 30%. Ultimately, in view of such characteristics, it does not appear possible to obtain from such stacks solar-control glazing units which combine relatively low normal emissivities, typically below 50%, and in particular of around 40% or even 35%, while maintaining a sufficiently high light transmission, i.e. typically above 30%.

The light characteristics and in particular the light transmission characteristics are measured according to the present invention according to the principles described in NF EN410 (2011).

In other publications, it has been proposed to use a material based on titanium nitride (TiN) as a functional layer, which also has low-emissivity properties and is less prone to corrosion than silver-based layers. Particular examples include DE102014114330, DE102013112990 or JPH05124839. The object of the present invention relates to solar-control glazing units incorporating stacks comprising such layers and aims more particularly to improve the properties thereof, specifically the combined properties of high light transmission and low emissivity of such glazing units.

The aim of the present invention is thus to provide glazing units comprising a stack of layers giving them solar-control properties as described above, while having a light transmission $T_L$ typically greater than 30%, preferably greater than or equal to 40%, or even greater than or equal to 50%, and a low normal emissivity $\varepsilon_n$, i.e. less than 50%, or less than 45% or even less than 40%, said stack being durable over time, in particular when it is placed directly on a face of the glazing unit exposed to the interior or even the exterior of the building or the passenger compartment, without any particular precautions.

Within the meaning of the present invention, the aim is therefore to have glazing units having the greatest $T_L/\varepsilon_n$ ratio, i.e. the selectivity of which is improved; a glazing unit withing the meaning of the present invention thus allows a significant portion of light in the visible range to pass through while reflecting a significant portion of the near IR radiation after a thermal treatment such as tempering, curving, annealing, etc.

Thus, the present invention makes it possible to obtain anti-sun glazing units capable of undergoing a heat treatment such as tempering, curving or more generally a heat treatment at temperatures above 500° C., said treatment making it possible in particular to improve the optical and energetic properties of said units, and in particular the selectivity thereof.

A glazing unit according to the invention also makes it possible to select the radiation passing through it by favoring the transmission of light waves, i.e. with a wavelength of between approximately 380 and 780 nm, and by limiting the passage of infrared radiation, with a wavelength of greater than 780 nm.

The invention makes it possible to maintain a strong illumination of the room or the passenger compartment protected by the glazing unit, while minimizing the amount of heat entering it.

According to another aspect, the glazing unit according to the present invention also has thermal insulation properties by virtue of the low-emissivity properties of the layer used, which makes it possible to limit heat exchanges between the interior and exterior of the building.

According to another advantage of the present invention, the glazing units provided with the stacks according to the invention are simple to produce compared to other known glazing units having anti-sun properties, in particular those comprising a silver-based stack.

In addition, they are resistant to moisture, to scratching and to acid attacks. In particular, the glazing units according to the invention exhibit improved longevity, in the sense that their initial thermal or solar insulation properties vary only very slightly under the chemical attacks to which they are subjected during their planned use.

They can thus be advantageously used as a single glazing unit (only one glass substrate), the stack preferably facing the inner face of the building or the passenger compartment to be protected.

More particularly, the present invention relates to a glass article having anti-sun properties comprising at least one glass substrate provided with a stack of layers, wherein the stack comprises and preferably consists of, successively from the surface of said substrate:

a first module $M_1$ consisting of a layer based on a dielectric material with a thickness $e_1$ or of a set of layers based on dielectric materials with a cumulative thickness $e_1$ of between 1 and 100 nm, a layer $TN_1$ comprising titanium nitride, preferably based on titanium nitride, or even consisting substantially of titanium nitride, with a thickness of between 2 nanometers and 80 nanometers, preferably between 4 and 70 nanometers, more preferably between 10 and 50 nm, a second module $M_2$ consisting of a layer based on a dielectric material with a thickness $e_2$ or of a set of layers based on dielectric materials with a cumulative thickness $e_2$ of between 1 and 100 nm, optionally a protective layer comprising or preferably based on a titanium oxide, a zirconium oxide, or a titanium-zirconium oxide, According to the invention, the stack also comprises an intermediate layer comprising, and preferably consisting substantially of, or simply consisting of, at least one element selected from silicon, aluminum, titanium or a mixture of at least two of these elements, said intermediate layer being deposited between said layer $TN_1$ and said first module $M_1$ and/or between said layer $TN_1$ and said second module $M_2$, said intermediate layer(s) having a thickness of between 0.2 nm and 6 nm, preferably between 0.5 nm and 5 nm, and more preferably between 1 and 4 nm.

According to preferred embodiments of the present invention, which may of course be combined with one another as appropriate:

Said element deposited to constitute the intermediate layer(s) is substantially aluminum. According to this embodiment, a layer consisting substantially or simply consisting of aluminum is therefore deposited between said layer $TN_1$ and said first module $M_1$ and/or said second module $M_2$ to form said intermediate layer (in particular by magnetron-assisted sputtering of an aluminum target in an atmosphere of a neutral gas such as argon).

Said element deposited to constitute the intermediate layer(s) is substantially silicon. According to this embodiment, a layer consisting substantially or simply consisting of silicon is therefore deposited between said layer $TN_1$ and said first module $M_1$ and/or said second module $M_2$ to form said intermediate layer (in particular by magnetron-assisted sputtering of a silicon target in an atmosphere of a neutral gas such as argon).

Said element deposited to constitute the intermediate layer(s) is substantially titanium. According to this embodiment, a layer consisting substantially or simply consisting of titanium is therefore deposited between said layer $TN_1$ and said first module $M_1$ and/or said second module $M_2$ to form said intermediate layer (in particular by magnetron-assisted sputtering of a titanium target in an atmosphere of a neutral gas such as argon). Preferably, titanium is at least deposited between said layer $TN_1$ and said second module $M_2$ to form said intermediate layer. According to another embodiment, a titanium layer is deposited between said layer $TN_1$ and said first module $M_1$ and a titanium layer is deposited between said layer $TN_1$ and said second module $M_2$ to form two intermediate layers on either side of the layer $TN_1$.

Said element deposited to constitute the intermediate layer(s) is substantially a mixture of aluminum and silicon. According to this embodiment, a layer consisting substantially or simply consisting of aluminum and silicon is therefore deposited between said layer $TN_1$ and said first module $M_1$ and/or said second module $M_2$ to form said intermediate layer (in particular by magnetron-assisted sputtering of a silicon target in an atmosphere of a neutral gas such as argon). According to this embodiment, the Si/Al mass ratio can vary between 99/1 and 1/99. In particular, it can be between 97/35 and 75/25, in particular between 95/5 and 80/20.

The elements deposited to constitute the intermediate layer(s) are silicon and titanium. According to this embodiment, a mixture consisting substantially of silicon and titanium is therefore deposited between said layer $TN_1$ and said first module $M_1$ and/or said second module $M_2$ to form said intermediate layer (in particular by magnetron-assisted sputtering of a target comprising a mixture of silicon and titanium in an atmosphere of a neutral gas such as argon). According to this embodiment, the Si/Ti mass ratio can vary between 99/1 and 1/99. In particular, it can be between 97/35 and 75/25, in particular between 95/5 and 80/20.

The elements deposited to constitute the intermediate layer(s) are aluminum and titanium. According to this embodiment, a mixture consisting substantially of aluminum and titanium is therefore deposited between said layer $TN_1$ and said first module $M_1$ and/or said second module $M_2$ to form said intermediate layer (in particular by magnetron-assisted sputtering of a target comprising a mixture of aluminum and titanium in an atmosphere of a neutral gas such as argon). According to this embodiment, the Al/Ti mass ratio can vary between 99/1 and 1/99. In particular, it can be between 97/35 and 75/25, in particular between 95/5 and 80/20.

The layers based on dielectric materials constituting the set of layers with a cumulative thickness $e_1$ are deposited successively and so as to be in contact with one another.

The layers based on dielectric materials constituting the set of layers with a cumulative thickness $e_2$ are deposited successively and so as to be in contact with one another.

The layer $TN_1$ and the intermediate layer(s) is (are) in contact with one another.

The module $M_1$, the layer $TN_1$, the module $M_2$ and the intermediate layer or layers are deposited successively and so as to be in contact with one another.

The modules $M_1$, $M_2$ comprise and preferably are based on materials selected from silicon nitride, aluminum nitride, aluminum-silicon nitride, tin oxide, mixed oxide of zinc and tin, silicon oxide, titanium oxide, silicon oxynitride, aluminum oxynitride or aluminum-silicon oxynitride. More preferably, the module or modules $M_1$, $M_2$ are based on materials selected from silicon nitride, aluminum-silicon nitride, silicon oxynitride, or aluminum-silicon oxynitride.

The first module $M_1$ comprises and preferably consists of a layer comprising silicon nitride or silicon-aluminum nitride, said layer comprising silicon nitride or silicon-aluminum nitride preferably still contacting said intermediate layer.

The second module $M_2$ comprises and preferably consists of a layer comprising silicon nitride or silicon-aluminum nitride, said layer comprising silicon nitride or silicon-aluminum nitride preferably still contacting said intermediate layer.

At least one of the modules $M_1$ or $M_2$ comprises or consists of a layer comprising and preferably consisting of silicon oxynitride and/or aluminum oxynitride, said layer comprising silicon oxynitride and/or aluminum oxynitride preferably being in contact with said intermediate layer.

The refractive index at 550 nm of said silicon oxynitride and/or aluminum oxynitride is between 1.60 and 1.99, preferably between 1.70 and 1.95. Said index can be adjusted in particular according to the N/O ratio in said material.

The stack comprises and preferably consists of the following sequence of layers, starting from the substrate surface: a layer based on silicon nitride or based on silicon oxynitride (optionally further comprising aluminum), said intermediate layer comprising at least one element selected from silicon aluminum, titanium, or a mixture of at least two of these elements, said layer TN1, optionally a second intermediate layer comprising at least one element selected from silicon aluminum, titanium, or a mixture of at least two of these elements, a layer based on silicon nitride or a layer based on silicon oxynitride (optionally further comprising aluminum), and optionally a protective layer selected in particular from oxides of titanium, zirconium or a mixture of titanium and zirconium.

The stack comprises and preferably consists of the following sequence of layers, starting from the substrate surface: a layer based on silicon nitride or based on silicon oxynitride (optionally further comprising aluminum), optionally another intermediate layer comprising at least one element selected from silicon aluminum, titanium, or a mixture of at least two of these elements, said layer $TN_1$, said intermediate layer comprising at least one element selected from silicon, aluminum, titanium, or a mixture of at least two of these elements, a layer based on silicon nitride or a layer based on silicon oxynitride (optionally further comprising aluminum), and optionally a protective layer selected in particular from oxides of titanium, zirconium or a mixture of titanium and zirconium.

Said stack comprises, starting from the substrate surface, the following layers in succession, each layer being successively in contact with the next one:

$SiN_x$ or SiON/Al, Si or Ti or SiAl/$TiN_x$/optionally Al, Si, Ti or SiAl/$SiN_x$ or SiON, or $SiN_x$ or SiON/optionally Al, Si or Ti or SiAl/$TiN_x$/optionally Al, Si, Ti or SiAl/$SiN_x$ or SiON, in which $SiN_x$ is a layer comprising or based on silicon nitride, SiON is a layer comprising or based on silicon oxynitride, Al, Si or AlSi is a layer respectively obtained by deposition of aluminum, silicon or a mixture of aluminum and silicon, TiN$_x$ is the layer TN$_1$ comprising or based on titanium nitride.

The stack comprises a plurality of layers comprising titanium nitride TN$_1$, TN$_2$ . . . , in particular two layers (TN$_1$ and TN$_2$) comprising titanium nitride, each layer comprising titanium nitride being separated from the next one in the stack by a layer based on a dielectric material or by a set of layers based on dielectric materials and optionally by an intermediate layer comprising at least one element selected from silicon, aluminum, titanium and mixtures thereof.

The stack does not contain any layers based on silver, platinum, gold or copper.

The glass substrate is made of clear glass. Without departing from the scope of the invention, it is also possible to deposit the stack on a substrate made of glass that is tinted or colored in its body. The expression "colored in its body" is understood to mean that the substrate comprises elements in its glass composition which are intended to give it a coloration (i.e. different from that of so-called "clear" glass), in particular elements such as cobalt, iron, selenium, or chromium, which may also be intended to reduce its light transmission.

The glass substrate provided with said stack has undergone a heat treatment after the deposition of said stack, and in particular has been tempered, annealed or curved.

The thickness e$_1$ of the first module M$_1$ is between 1 nm and 100 nanometers, inclusive, and in particular between 10 and 70 nm, inclusive.

The thickness e$_2$ of the second module M$_2$ is between 5 nm and 100 nanometers, inclusive, and in particular between 20 and 70 nm, inclusive.

The glass article comprises two glass substrates joined by a thermoplastic film, in particular consisting of polyvinyl butyral PVB, at least one of said substrates being provided with said stack of layers, said stack being arranged preferably on a face of a substrate facing the inside of said glazing unit, or in contact with the thermoplastic film.

Preferably, the functional layers according to the invention are based on titanium nitride or preferably consist substantially of titanium nitride.

A layer based on titanium nitride (or another material) comprises for example at least 50% by weight of titanium nitride (or said other material), or more than 60% by weight of titanium nitride (or said other material), or even more than 80% by weight (or said other material), or even more than 90% by weight of titanium nitride (or said other material).

The titanium nitride according to the invention is not necessarily stoichiometric (Ti/N atomic ratio of 1) but can be over- or under-stoichiometric. According to one advantageous embodiment, the N/Ti ratio is between 1 and 1.2. Also, the titanium nitride according to the invention can comprise a minor amount of oxygen, for example between 1 and 10 mol. % oxygen, in particular between 1 and 5 mol. % oxygen.

According to a particularly preferred embodiment, the titanium nitride layers according to the invention have the general formula TiN$_x$O$_y$, in which $1.00<x<1.20$ and in which $0.01<y<0.10$.

The dielectric materials, once deposited in thin layers, can however comprise additional elements which significantly increase their electrical conductivity, and are useful for example to improve the sputtering efficiency of the precursor material constituting the magnetron target. The dielectric layers of the modules M$_1$, M$_2$ according to the invention can be layers based on a material selected from silicon nitride, aluminum nitride, tin oxide, a mixed oxide of zinc or tin, silicon oxide, titanium oxide and silicon oxynitride, and the modules M$_1$ and M$_2$ preferably consist of a single layer and this layer is based on silicon nitride. A material based on silicon nitride, tin oxide, mixed oxide of zinc and tin, silicon oxide, titanium oxide or silicon oxynitride is, for example, a material which consists predominantly and preferably substantially of such a compound, but which may also contain other minority elements, in particular as a substitute for cations, for example in order to promote the deposition thereof in the form of thin layers by the conventional techniques of magnetron sputtering as described above. By way of example, the layers according to the present invention of silicon nitride or silicon oxynitride, or of silicon oxide, in particular those deposited by magnetron, usually comprise elements of the type Al, Zr, B, etc. in proportions of, for example, up to 10 at. % or even sometimes up to 20 at. %, based on the silicon content of the layer. Similarly, the titanium oxide layers can comprise other minority metal cations such as zirconium as a substitute for titanium, without departing from the scope of the present invention.

The glazing unit according to the invention can be a simple glazing unit in which the stack of thin layers is preferably arranged on face 2 of the simple glazing unit when numbering the faces of the substrate from the exterior to the interior of the building or passenger compartment provided with said unit.

The intermediate layers according to the invention deposited from metal targets consisting of Ti, Si, Al or a mixture of at least two of these elements can comprise nitrogen or oxygen, even before any heat treatment.

Thus, SIMS (secondary ion mass spectrometry) analyses have shown that said layers comprise a minor amount of such heteroatoms, even in the absence of nitrogen or oxidizing gas during their deposition by sputtering (in particular in an atmosphere of 100% argon), without it being possible to determine the exact amount thereof in the layer in question by the techniques which are currently available. The same applies to the glass articles according to the invention.

According to another embodiment, the glazing unit according to the invention can be a laminated glazing unit, comprising two glass substrates joined by a thermoplastic film, in particular a polyvinyl butyral or PVB film, said glazing unit being provided with a stack of layers as described above. The stack is preferably deposited on the face of the substrate facing the inside of the laminated structure, in particular on face 2 of the glazing unit, and even more preferably it is in contact with the thermoplastic film. Alternatively, it can be deposited on the inner face of the laminated glazing unit, i.e. on face 4 of the glazing unit, the faces being conventionally numbered from 1 to 4 from the outside to the inside of the glazing unit.

The substrates described above can, of course, be thermally tempered and/or curved after the deposition of the stack according to the invention.

A method for producing an article according to the invention comprises, for example, at least the following steps:

a glass substrate is introduced into a sputtering device, at least one underlayer of a dielectric material is deposited in one or more first compartments, in another compartment, a titanium target is sputtered by means of a plasma generated from a gas comprising nitrogen, preferably in mixture with a rare gas such as argon, under conditions for obtaining a titanium nitride layer, at least one overlayer of a dielectric material is deposited in one or more further compartments.

According to the present invention, in a compartment comprising a target consisting of aluminum, silicon, titanium or a mixture of at least two of these elements, in particular silicon and aluminum, located immediately before and/or after the compartment equipped with the titanium target, a thin layer of 1 to 6 nm of aluminum, silicon, titanium or a mixture of at least two of these elements, in particular silicon and aluminum, is deposited by sputtering said target in the presence of a neutral gas, for example exclusively argon.

The term "overlayer" in the present description refers to the respective position of said layers relative to the functional layer(s) in the stack, said stack being supported by the glass substrate. In particular, the overlayer is the outermost layer of the stack, facing away from the substrate.

The thickness of a layer within the meaning of the present invention is understood to mean the actual geometric thickness of the layer, as can be measured in particular by conventional electron microscopy or other techniques.

The invention and its advantages are described in more detail below by means of the following non-limiting examples according to the invention. In all examples and the description, unless otherwise specified, the thicknesses given are geometric.

The properties and advantages of the glazing unit according to the invention are illustrated by the following examples:

In a well known manner, in the following examples the different successive layers are deposited in successive dedicated compartments of the sputtering device, each compartment being provided with a specific metal target consisting of Si, Ti, Al, Al-Si, selected for the deposition of a specific layer of the stack, and being supplied with a specific gas composition of the desired composition for each layer.

More precisely, the layers based on silicon nitride are deposited in compartments of the device from a silicon metal target (comprising 8% by weight of aluminum), in a reactive atmosphere containing argon and nitrogen according to well known techniques. The silicon nitride layers therefore also contain aluminum.

The layer based on silicon oxynitride is deposited in a compartment of the device from the silicon metal target (comprising 8% by weight of aluminum), in a reactive atmosphere containing argon, nitrogen and oxygen. The respective flow rates of the gases introduced into the compartment are 20 sccm (standard cubic centimeters per minute) of Ar, 5 sccm of $O_2$, and 100 sccm of $N_2$. The refractive index at 550 nm measured for this material is 1.88.

The titanium nitride layers are deposited in other compartments of the device from a pure titanium metal target in a reactive atmosphere containing nitrogen and argon.

The aluminum or aluminum-silicon alloy layers were deposited from the sputtering of a target of the same composition in a neutral argon atmosphere.

The titanium layers were deposited from a pure titanium metal target in a neutral argon atmosphere.

The conditions for magnetron deposition of such layers, in particular for obtaining a desired thickness of each layer of the stack, are technically well known in the field.

EXAMPLE 1

According to reference example 1, the glass substrate is successively covered with a stack of layers comprising an underlayer (layer $M_1$) based on silicon nitride (hereinafter noted for convenience as $Si_3N_4$ even if this is not necessarily the actual stoichiometry of the layer), a functional layer based on titanium nitride, and an overlayer (layer $M_2$) also based on silicon nitride (hereinafter noted for convenience as $Si_3N_4$ even if this is not necessarily the actual stoichiometry of the layer).

EXAMPLES 2 AND 3

According to examples 2 and 3 according to the invention, an intermediate layer of aluminum (example 2) or of a silicon-aluminum alloy comprising 8% by weight of aluminum (example 3) are deposited on top of the titanium nitride layer (i.e. between the TiN layer and the $Si_3N_4$ overlayer) in the stack of reference example 1.

EXAMPLE 4

According to example 4 according to the invention, a two-nanometer intermediate layer of titanium metal is deposited between the TiN layer and the $Si_3N_4$ underlayer in the stack of reference example 1.

EXAMPLE 5

According to example 5 according to the invention, a one-nanometer intermediate layer of titanium metal is deposited between the TiN layer and the $Si_3N_4$ overlayer and another one-nanometer layer of titanium metal is inserted between the TiN layer and the $Si_3N_4$ underlayer.

EXAMPLE 6

According to comparative example 6, an intermediate layer of nickel-chromium (80% by weight nickel, 20% by weight chromium) is deposited between the TiN layer and the $Si_3N_4$ overlayer in the stack of reference example 1.

EXAMPLE 7

According to comparative example 7, a 2 nm thick intermediate layer of niobium nitride is inserted between the TiN layer and the $Si_3N_4$ overlayer in the stack of reference example 1.

EXAMPLE 8

In this example, the silicon nitride overlayer constituting the module $M_2$ in example 2 was replaced by a layer of silicon oxynitride with a refractive index at 550 nm of 1.88.

All substrates are made of 4 mm thick clear Planiclear® glass sold by Saint-Gobain Glass France. All layers are deposited in a known manner by magnetic-field-assisted sputtering (often referred to as magnetron sputtering).

The deposition conditions were adjusted according to conventional techniques for magnetron deposition in order to obtain different stacks of which the succession of layers and the thicknesses thereof (in nanometers nm) are reported in table 1 below:

TABLE 1

| Example | $Si_3N_4$ ($M_1$) | IL* | TiN ($TN_1$) | IL* | $Si_3N_4$ ($M_2$) | Type of deposition IL |
|---|---|---|---|---|---|---|
| Example 1 (reference) | 30 | — | 20 | — | 30 | — |
| Example 2 (invention) | 30 | — | 20 | 2 | 30 | Al |
| Example 3 (invention) | 30 | — | 20 | 2 | 30 | Si—Al |
| Example 4 (invention) | 30 | 2 | 20 | — | 30 | Ti |
| Example 5 (invention) | 30 | 1 | 20 | 1 | 30 | Ti |
| Example 6 (comparative) | 30 | — | 20 | 2 | 30 | NiCr |
| Example 7 (comparative) | 30 | — | 20 | 2 | 30 | NbN |
| Example 8 (invention) | 30 | — | 20 | 3 | 30** | Al |

*IL: intermediate layer
**silicon oxynitride SiON with a refractive index of 1.88 at 550 nm.

All the glazing units thus obtained according to examples 1 to 8 are then subjected to a heat treatment at 650° C. for 10 minutes.

A—Measuring Characteristics of the Glazing Units

The thermal and optical characteristics of the glazing units before and after tempering were measured according to the following principles and standards:)

1°) Optical Properties:

The measurements are made in accordance with the NF EN410 (2011) standard mentioned above. More precisely, the light transmission $T_L$ is measured between 380 and 780 nm according to the illuminant $D_{65}$.

2°) Thermal Properties:

The normal emissivity $\varepsilon_n$ was measured according to the ISO 10292 standard mentioned above.

B—Results

The results obtained for the monolithic glazing units according to the examples described above are compiled in table 2 below:

TABLE 2

| Example | $T_L$ After tempering | $\varepsilon_n$ After tempering | $T_L/\varepsilon_n$ After tempering |
|---|---|---|---|
| 1 (ref.) | 54.1 | 40.6 | 1.33 |
| 2 (inv.) | 54.5 | 37.9 | 1.44 |
| 3 (inv.) | 55.5 | 38.0 | 1.46 |
| 4 (inv.) | 52.7 | 34.8 | 1.51 |
| 5 (inv.) | 50.7 | 32.6 | 1.56 |
| 6 (comp.) | 48.5 | 35.8 | 1.35 |
| 7 (comp.) | 52.5 | 49 | 1.07 |
| 8 (inv.) | 53.5 | 34.9 | 1.53 |

Examples 2 and 3 are examples according to the present invention. For these two examples, after tempering, a light transmission of around 55% is observed, which is surprisingly higher than that of the same stack without the intermediate layer of aluminum or of an Si-Al alloy according to the invention. According to an advantageous characteristic, the emissivity at normal incidence is also significantly reduced compared to reference example 1.

Examples 4 and 5 according to the present invention show a slight decrease in light transmission but also a much decreased emissivity compared to the reference example.

Ultimately, the use of the intermediate layer in the stack according to the invention thus makes it possible to obtain a light transmission equal to or substantially comparable to that of the reference stack, while improving the thermal properties of the glazing unit.

Ultimately, it is observed that the selectivity of the glazing unit, as measured by the $T_L/\varepsilon_n$ ratio, is significantly improved for the glazing units according to the invention, especially after tempering.

The comparative glazing unit according to example 6, comprising an intermediate layer made of an NiCr alloy, has a substantially reduced light transmission compared to the reference example and the examples according to the invention, and ultimately a selectivity that is substantially equal to the reference glazing unit.

The comparative glazing unit according to example 7, comprising an NbN intermediate layer, has a degraded selectivity compared to the reference example.

The glazing unit according to example 8, in which a silicon (and aluminum) oxynitride layer is used in contact with the intermediate layer, also has improved selectivity compared to the reference example.

When considering the $T_L/\varepsilon_n$ selectivities of the glazing units according to examples 1 to 8, as reported in table 2, it can be seen that the glazing units according to the invention have the best selectivities, after having undergone a thermal treatment.

According to other complementary examples, it is sought to determine what thickness of aluminum, used to constitute the intermediate layer, is optimal for selectivity by varying said thickness in the stack described according to example 2 above. The results obtained are compiled in table 3 below:

TABLE 3

| Example | Al layer thickness (nm) | $T_L$ After tempering | $\varepsilon_n$ After tempering | $T_L/\varepsilon_n$ After tempering |
|---|---|---|---|---|
| 1 (ref.) | 0 | 54.1 | 40.6 | 1.33 |
| 2 | 2 | 54.5 | 37.9 | 1.44 |
| 2a | 1 | 54.7 | 40.1 | 1.44 |
| 2b | 3 | 54.9 | 34.1 | 1.61 |
| 2c | 4 | 52.9 | 32.8 | 1.61 |
| 2d | 5 | 51.3 | 32.9 | 1.56 |

The analysis of the data reported in table 3 shows that the best results and compromises are obtained when the thickness of the aluminum intermediate layer is between 2 and 4 nm.

The invention claimed is:

1. A glass article having anti-sun properties comprising at least one glass substrate provided with a stack of layers, wherein the stack of layers comprises, successively from a surface of said at least one glass substrate:
    a first module $M_1$ consisting of a layer based on a dielectric material with a thickness $e_1$ or of a set of layers based on dielectric materials with a cumulative thickness $e_1$, said thickness $e_1$ being between 1 and 100 nm,
    a layer $TN_1$ comprising titanium nitride, with a thickness of between 2 nanometers and 80 nanometers,
    a second module $M_2$ consisting of a layer based on a dielectric material with a thickness $e_2$ or of a set of layers based on dielectric materials with a cumulative thickness $e_2$, said thickness $e_2$ being between 5 and 100 nm,
    wherein an intermediate layer is deposited between said layer $TN_1$ and said first module $M_1$ and/or between said layer $TN_1$ and said second module $M_2$, said intermediate layer between said layer $TN_1$ and said first module $M_1$ and/or between said layer $TN_1$ and said second module $M_2$ having a thickness of between 0.2 nm and 6 nm,
wherein said intermediate layer is deposited by sputtering and is selected from a layer consisting of aluminum, titanium, silicon and any combination thereof, and
wherein the stack of layers that is in contact with the glass article does not contain any layers based on silver, platinum or gold.

2. The glass article according to claim 1, wherein the intermediate layer is a metallic layer consisting of aluminum.

3. The glass article according to claim 1, wherein the intermediate layer is a layer consisting of silicon.

4. The glass article according to claim 1, wherein the intermediate layer is a layer consisting of a mixture of silicon and aluminum.

5. The glass article according to claim 1, wherein the intermediate layer is a metallic layer consisting of titanium.

6. The glass article according to claim 1, wherein the modules $M_1$ and $M_2$ comprise materials selected from silicon nitride, aluminum nitride, aluminum-silicon nitride, tin oxide, mixed oxide of zinc and tin, silicon oxide, titanium oxide and silicon oxynitride.

7. The glass article according to claim 1, wherein the first module $M_1$ comprises a layer comprising silicon nitride or silicon-aluminum nitride, said layer comprising silicon nitride or silicon-aluminum nitride contacting the intermediate layer.

8. The glass article according to claim 1, wherein the first module $M_2$ comprises a layer comprising silicon nitride or silicon-aluminum nitride, said layer comprising silicon nitride or silicon-aluminum nitride contacting the intermediate layer.

9. The glass article according to claim 1, wherein at least one of the modules $M_1$ or $M_2$ comprises a layer comprising silicon oxynitride and/or aluminum oxynitride, the layer of silicon oxynitride and/or aluminum oxynitride contacting the intermediate layer.

10. The glass article according to claim 1, wherein the stack of layers comprises the following sequence of layers, starting from the substrate surface:
said first module M1 comprising a layer based on silicon nitride or based on silicon oxynitride,
said intermediate layer selected from a layer consisting of aluminum, titanium, silicon and any combination thereof,
said layer TN1,
optionally a second intermediate layer selected from a layer consisting of aluminum, titanium, silicon and any combination thereof,
said second module M2 comprising a layer based on silicon nitride or a layer based on silicon oxynitride, and
optionally a protective layer selected from oxides of titanium, zirconium or a mixture of titanium and zirconium.

11. The glass article according to claim 1, wherein the stack of layers comprises the following sequence of layers, starting from the substrate surface:
said first module M1 comprising a layer based on silicon nitride or based on silicon oxynitride, titanium, or a mixture of at least two of said elements,
optionally another intermediate layer selected from a layer consisting of aluminum, titanium, silicon and any combination thereof,
said layer TN1,
said intermediate layer selected from a layer consisting of aluminum, titanium, silicon and any combination thereof,
said second module M2 comprising a layer based on silicon nitride or a layer based on silicon oxynitride, and
optionally a protective layer selected from oxides of titanium, zirconium or a mixture of titanium and zirconium.

12. The glass article according to claim 1, wherein the stack of layers comprises a plurality of layers comprising titanium nitride, each layer comprising titanium nitride being separated from the next one in the stack by a layer based on a dielectric material or by a set of layers based on dielectric materials, and optionally an intermediate layer selected from a layer consisting of aluminum, titanium, silicon and any combination thereof.

13. The glass article according to claim 1, wherein the at least one glass substrate is made of clear glass.

14. The glass article according to claim 1, wherein said glass substrate or substrates provided with said stack of layers are tempered or curved.

15. The glass article according to claim 1, wherein the module $M_1$, the layer $TN_1$, the module $M_2$ and the intermediate layer between said layer $TN_1$ and said first module $M_1$ and/or between said layer $TN_1$ and said second module $M_2$ are deposited so as to be in contact with one another.

16. The glass article according to claim 1, wherein said thickness $e_1$ is between 10 and 70 nm.

17. The glass article according to claim 1, wherein the thickness of the layer TN1 is between 10 and 50 nm.

18. The glass article according to claim 1, wherein the thickness $e_2$ is between 20 and 70 nm.

19. The glass article according to claim 1, wherein the intermediate layer between said layer $TN_1$ and said first module $M_1$ and/or between said layer $TN_1$ and said second module $M_2$ has a thickness of between 1 nm and 4 nm.

* * * * *